United States Patent
Sakai et al.

(10) Patent No.: US 10,789,705 B2
(45) Date of Patent: Sep. 29, 2020

(54) QUALITY MONITORING SYSTEM

(71) Applicant: KABUSHIKI KAISHA TOSHIBA, Minato-ku (JP)

(72) Inventors: Risa Sakai, Yokohama (JP); Wataru Yamada, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/423,907

(22) Filed: May 28, 2019

(65) Prior Publication Data

US 2019/0295238 A1 Sep. 26, 2019

Related U.S. Application Data

(63) Continuation of application No. PCT/JP2018/035333, filed on Sep. 25, 2018.

(30) Foreign Application Priority Data

Mar. 26, 2018 (JP) .................................. 2018-057425

(51) Int. Cl.
*G06T 7/00* (2017.01)

(52) U.S. Cl.
CPC .... *G06T 7/001* (2013.01); *G06T 2207/20021* (2013.01); *G06T 2207/30164* (2013.01)

(58) Field of Classification Search
None
See application file for complete search history.

(56) References Cited

U.S. PATENT DOCUMENTS

2017/0243339 A1 8/2017 Yamamoto et al.

FOREIGN PATENT DOCUMENTS

| JP | 4-6404 A | | 1/1992 |
| JP | 09-200734 A | * | 7/1997 |
| JP | 9-200734 A | | 7/1997 |
| JP | 2003-044120 A | * | 2/2003 |
| JP | 2003-44120 A | | 2/2003 |
| JP | 2017-144532 | | 8/2017 |
| JP | 2017-215239 A | | 12/2017 |

OTHER PUBLICATIONS

International Search Report dated Dec. 25, 2018 in PCT/JP2018/035333 filed Sep. 25, 2018 (with English Translation of Categories of Cited Documents).
Written Opinion dated Dec. 25, 2018 in PCT/JP2018/035333 filed Sep. 25, 2018.

* cited by examiner

*Primary Examiner* — Lindsay J Uhl
(74) *Attorney, Agent, or Firm* — Oblon, McClelland, Maier & Neustadt, L.L.P.

(57) ABSTRACT

A quality monitoring system according to an embodiment includes an imager, an inspector, and a processor. The imager repeatedly acquires a first image of an equipment. The equipment repeats a first operation processing a workpiece. The first image is of the equipment imaged at a first timing of the first operation. The inspector inspects a quality of the workpiece after processing. The processor decides, based on a plurality of the first images, an evaluation of the equipment imaged in each of the first images. The processor analyzes a correlation between a plurality of the evaluations and a plurality of the qualities.

4 Claims, 7 Drawing Sheets

FIG. 8

QUALITY MONITORING SYSTEM

CROSS-REFERENCE TO RELATED APPLICATIONS

This is a continuation application of International Application PCT/JP2018/035333, filed on Sep. 25, 2018. This application also claims priority to Japanese Application No. 2018-057425, filed on Mar. 26, 2018. The entire contents are incorporated herein by reference.

FIELD

Embodiments of the invention relate generally to a quality monitoring system.

BACKGROUND

There is a system that monitors qualities of workpieces processed by an equipment. For such a quality monitoring system, it is desirable to develop technology that can more easily analyze a correlation between an operation of equipment and quality.

BRIEF DESCRIPTION OF THE DRAWINGS

FIG. 2, FIG. 3A to FIG. 3C, FIG. 4, and FIG. 5A to FIG. 5C are schematic views for explaining the quality monitoring system according to the embodiment;

DETAILED DESCRIPTION

A quality monitoring system according to an embodiment includes an imager, an inspector, and a processor. The imager repeatedly acquires a first image of an equipment. The equipment repeats a first operation processing a workpiece. The first image is of the equipment imaged at a first timing of the first operation. The inspector inspects a quality of the workpiece after processing. The processor decides, based on a plurality of the first images, an evaluation of the equipment imaged in each of the first images. The processor analyzes a correlation between a plurality of the evaluations and a plurality of the qualities.

Various embodiments are described below with reference to the accompanying drawings.

In this specification and each drawing, components similar to those described above are marked with the same reference numerals; and a detailed description is omitted as appropriate.

Figure 1:
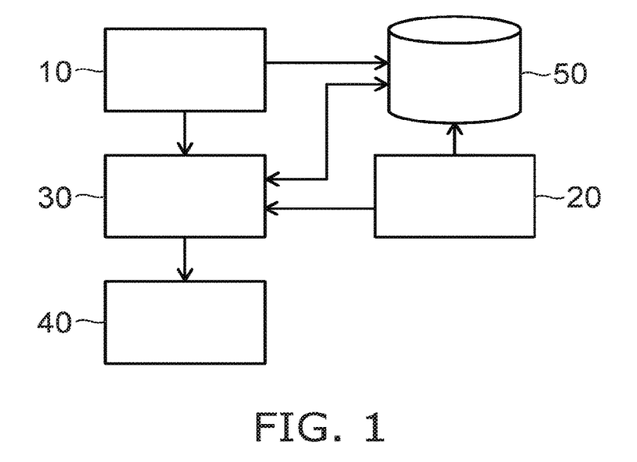
FIG. 1 is a block diagram illustrating the configuration of a quality monitoring system according to an embodiment.

FIG. 1 is a block diagram illustrating the configuration of a quality monitoring system according to an embodiment.

As illustrated in FIG. 1, the quality monitoring system 1 according to the embodiment includes an imager 10, an inspector 20, a processor 30, an outputter 40, and memory 50. The quality monitoring system 1 is used to analyze and check the correlation between the operation of the equipment and the quality of the workpiece processed by the equipment.

The imager 10 images the equipment repeating some first operation and acquires a still image. Specifically, the imager 10 repeatedly images the state of the equipment at a first timing when a first time has elapsed from when the equipment starts the first operation. The first image that illustrates the equipment at the first timing is repeatedly acquired thereby. The imager 10 stores the imaged images in the memory 50.

The inspector 20 inspects the quality of the workpiece processed by the equipment. For example, the inspector 20 inspects the quality (the visual quality) from the appearance of the workpiece. Other than this, the inspector 20 may inspect the electrical property, thermal property, strength, durability, or the like of the workpiece. The inspector 20 stores the inspection result in the memory 50.

The processor 30 refers to the memory 50 and acquires imaged multiple first images. The processor 30 decides an evaluation of the equipment imaged in the first image based on the first images. The evaluation indicates, for example, how abnormal the equipment imaged in one first image is to the equipment imaged in another one first image.

For example, in the case where the state of the equipment imaged in the previous first image and the state of the equipment imaged in the new first image are substantially the same, the degree of abnormality is small. This corresponds to, for example, the state in which the evaluation is low. In the case where the state of the equipment inside the previous first image and the state of the equipment inside the new first image are significantly different, the degree of abnormality is large. This corresponds to, for example, the state in which the evaluation is high. The evaluation is represented by, for example, a numerical value.

The processor 30 further refers to the memory 50 and acquires the inspection result of the quality by the inspector 20. The processor 30 analyzes the correlation between the quality and the evaluation. For example, in the case where the quality deteriorates as the evaluation gets higher, the quality and the evaluation are correlated. The correlation can be analyzed, for example, by performing unsupervised machine learning using the multiple qualities of the inspection results and the multiple evaluations. The processor 30 transmits, for example, the determination result to the outputter 40.

For example, the outputter 40 causes information indicating the qualities, the evaluations, and the correlation to be displayed. The outputter 40 may transmit the information to a preset destination. The information includes, for example, a chart or a table. Other than this, the outputter 40 may emit a sound, light or the like for alerting the user.

The imager 10 is, for example, a camera. The processor 30 includes a CPU (Central Processing Unit), memory, etc. The outputter 40 is, for example, a monitor, a printer, a speaker, lighting, etc.

The specific configuration of the inspector 20 can be appropriately changed according to the content of the inspection to be performed. For example, in the case of inspecting the appearance of the workpiece processed by the equipment, the inspector 20 includes a camera. In the case of inspecting the electrical property of the workpiece, the inspector 20 includes a measuring instrument and a control unit for measuring the electrical property.

The quality monitoring system 1 according to the embodiment can analyze the correlation between the evaluation on the operation of the equipment and the quality of the workpiece processed by the equipment. The evaluation is decided based on the new first image and the previous first image. Thus, it is not necessary to prepare reference data etc. for deciding the evaluation. Therefore, the quality monitoring system 1 can be more easily installed into the equipment to be monitored. It is possible to easily perform the analysis of the correlation between the evaluation and the quality. For example, the quality monitoring system 1 can be applied to equipment that has just been operated without preparing reference data.

According to the quality monitoring system 1, it is possible to analyze the correlation between the evaluation and the quality when the new first image is acquired and the inspection result of the workpiece is obtained. Thereby, the relationship between the equipment and the quality can be analyzed in real time to monitor the quality. Thus, for example, in the case where deterioration of the quality is likely to occur in the future, the equipment can be stopped in advance, and mass production of low quality products can be prevented. According to the quality monitoring system 1, it is also possible to show the user how to improve the quality by analyzing the correlation between the evaluation and the quality.

The imager 10 may video-record the equipment. The processor 30 acquires the multiple first images by extracting a part of the video image. In such a case, the data amount becomes extremely large. Therefore, it is desirable for the imager 10 to acquire a still image by imaging the equipment at the first timing of the first operation. In other words, the imager 10 does not image the equipment in at least a part of the first operation other than the first timing. The data amount can be reduced by acquiring only the still image at the designated instant.

The imager 10 may further repeatedly image the equipment at another timing of the first operation. For example, the imager 10 acquires a second image and a third image by imaging the equipment at a second timing and a third timing of the first operation. The second timing is before the first timing. The third timing is before the second timing.

The processor 30 may perform the processing described above for the second image and the third image. In other words, the processor 30 decides the evaluation of the equipment imaged in the second image based on the multiple second images. The processor 30 decides the evaluation of the equipment imaged in the third image based on the multiple third images. The processor 30 analyzes the correlations between the respective evaluations and the quality.

FIG. 2, FIG. 3A to FIG. 3C, FIG. 4, and FIG. 5A to FIG. 5C are schematic views for explaining the quality monitoring system according to the embodiment.

Figure 2:
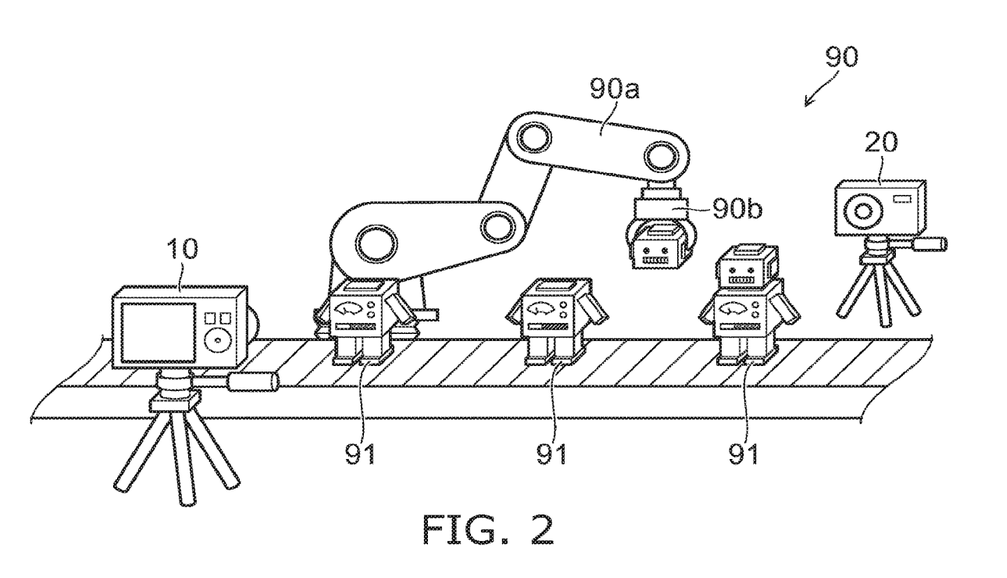

In the example illustrated in FIG. 2, an equipment 90 processes a workpiece 91 moving on a conveyor. In the example, the workpiece 91 is a partly-finished workpiece partway through assembly. The imager 10 images the equipment 90 and the workpiece 91. Other subjects other than the workpiece and the equipment which is the monitoring object may be included in the image. However, to increase the precision of the monitoring, it is desirable for movement of the other subjects to be small or nil.

The workpiece 91 moved on the conveyor is imaged by the inspector 20. In this example, the inspector 20 inspects the appearance of the processed workpiece 91. For example, the inspector 20 inspects the positional relationship between a part and another part of the workpiece 91, the inclination of a part with respect to another part, or the like. For example, the inspector 20 outputs the inspection result of quality such as a deviation amount with respect to a prescribed value, or whether the processed workpiece 91 is OK or NG.

Figure 3A:
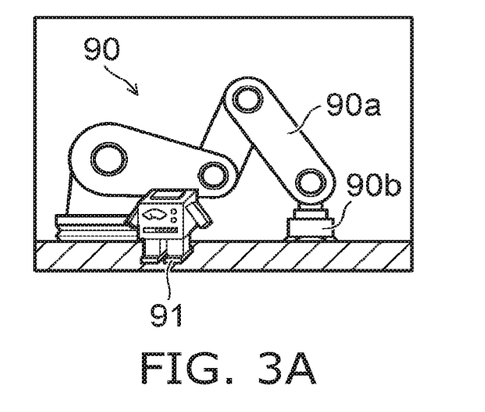
Figure 3B:
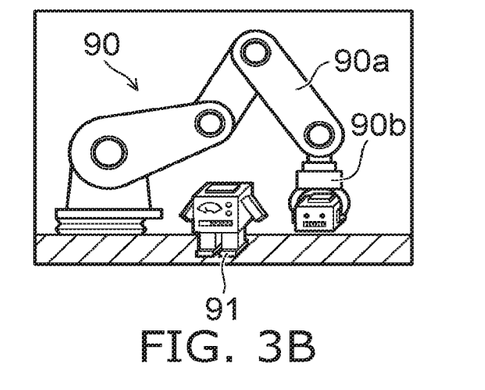
Figure 3C:
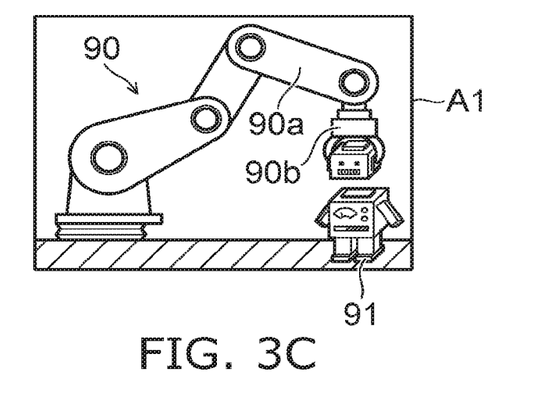

FIG. 3A to FIG. 3C illustrate the normal operation of the equipment 90. The equipment 90 repeatedly performs the series of operations (the first operation) illustrated in FIG. 3A to FIG. 3C. For example, the imager 10 images the equipment 90 at the first timing of the first operation, and acquires the first image A1 illustrated in FIG. 3C. Each time the first operation is performed, the imager 10 repeatedly images the equipment 90 and the workpiece 91.

For example, the imager 10 receives a signal associated with the operation of the equipment 90. The timing of imaging the equipment 90 is designated using the timing of receiving this signal as a reference. As an example, the imager 10 receives a control signal input to the equipment 90 when starting the first operation. The imager 10 uses the reception of the control signal as the starting point of the measurement of the time. The imager 10 images the equipment 90 at a designated timing after a prescribed length of time has elapsed from the starting point. Or, the imager 10 may image a video image of the equipment 90 and use, as the starting point of the measurement of the time, the point when the equipment 90 or the workpiece 91 reach a designated state.

Figure 4:
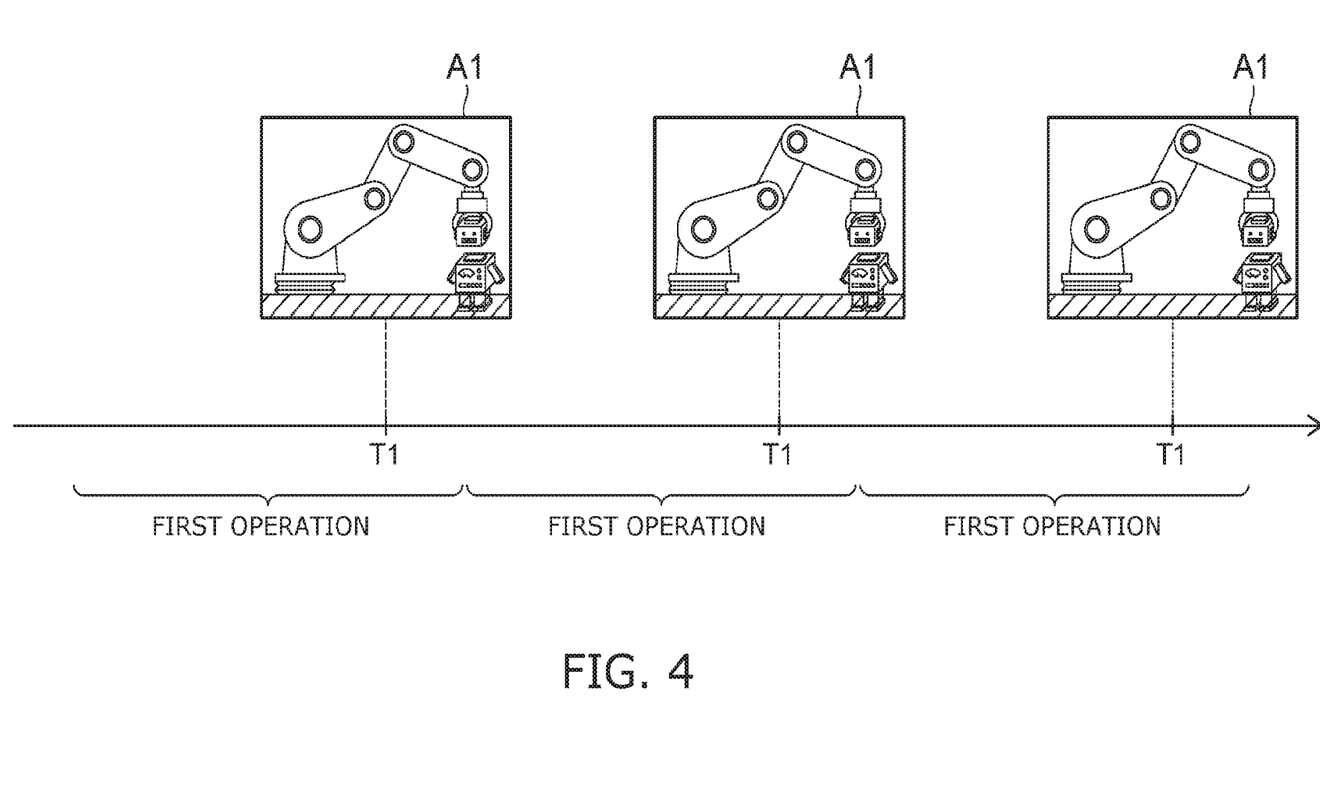

In FIG. 4, the horizontal axis is a time T. For example, as illustrated in FIG. 4, the imager 10 images the equipment 90 and the workpiece 91 at a first timing T1, and acquires a first image A1. The imaging is performed by the imager 10 each time the equipment 90 performs the first operation. As a result, the multiple first images A1 are acquired as illustrated in FIG. 4.

After the inspector 20 inspects the quality of the workpiece 91, the processor 30 refers to the first image of the equipment 90 imaged when the inspected workpiece 91 was being processed. For example, the time from the starting point of the first operation to the inspection by the inspector 20 is set by the user. Based on the set time, the processor 30 associates the inspection result of the quality of the workpiece with the evaluation on the equipment when the workpiece was processed. Or, the processor 30 may associate the inspection result with the evaluation based on the timing at which the equipment 90 was imaged, a signal when the workpiece 91 was transferred, and the like. Or, in the case where unique identification information is attached to the workpiece 91, the inspection result may be associated with the evaluation using the identification information. For example, the identification information is read when the workpiece 91 is processed by the equipment 90 and when the workpiece 91 is inspected by the inspector 20. The processor 30 associates the inspection result and the evaluation which are related to the same identification information of the workpiece 91.

The processor 30 decides the evaluation of the equipment imaged in the first image, based on the first image and the previous first image. The evaluation relates, for example, to the degree of abnormality of the equipment imaged in the image, and is represented by the difference of a feature between the two images. For example, as the difference of the feature is larger, it indicates that the degree of abnormality of one image with respect to the other image is larger. As a method (an algorithm) of extracting feature, for example, SIFT (Scale-Invariant Feature Transform) or SURF (Speed-Upped Robust Feature) can be used.

The evaluation may be related to the degree of normality of the equipment imaged in the image and may be represented by the similarity between the two images. As the similarity is higher, it indicates that the two images are similar and the degree of normality is higher (the degree of abnormality is smaller). The processor 30 analyzes the correlation between the quality of the inspection result and the evaluation.

Figure 5A:
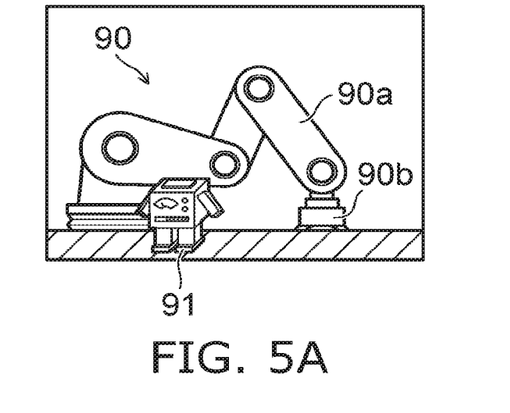
Figure 5B:
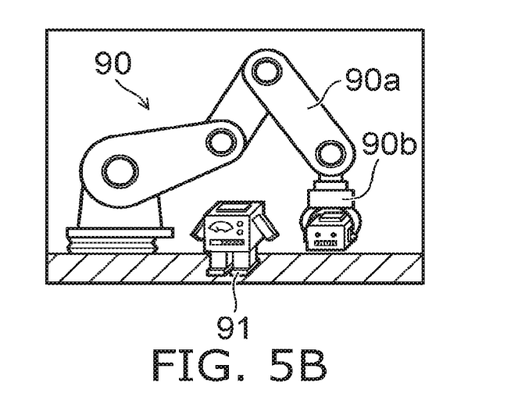
Figure 5C:
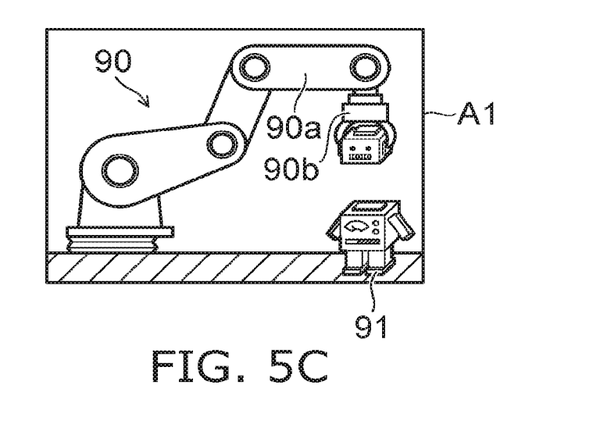

FIG. 5A to FIG. 5C illustrate the first operation in the case where an abnormality exists in the equipment 90. FIG. 5A and FIG. 5B are respectively the same as the operation when normal illustrated in FIG. 3A and FIG. 3B. On the other hand, the position (the angle) of an arm 90*a* and the position of a hand 90*b* of the equipment 90 in FIG. 5C are different from those of the state illustrated in FIG. 3C. The processor 30 decides the evaluation on the equipment 90 imaged in the first image A1 of FIG. 5C, based on the first image A1 of FIG. 3C and the first image A1 of FIG. 5C. In such a case, the equipment 90 is evaluated that the degree of abnormality is large.

Figure 6:
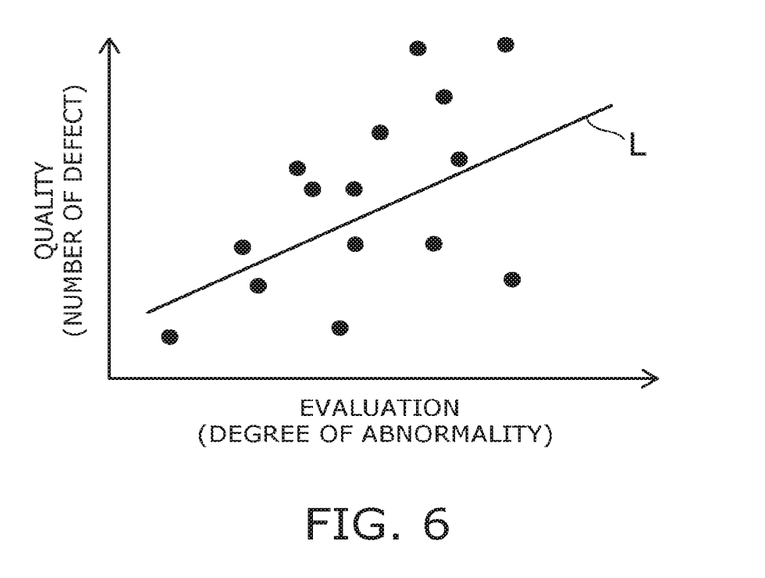
FIG. 6 is a chart illustrating an analysis result by the quality monitoring system according to the embodiment.

FIG. 6 is a chart illustrating an analysis result by the quality monitoring system according to the embodiment.

In FIG. 6, the horizontal axis is the evaluation of the equipment by the processor 30. The vertical axis is the quality. As an example, the evaluation relates to the degree of abnormality in FIG. 6. The quality relates to the number of defects. FIG. 6 shows how many defects occur at each degree of abnormality. For example, as a result of the correlation analysis by the processor 30, a correlation between the evaluation and the quality as represented by a straight line L is determined to exist. The processor 30 causes the outputter 40 to display, for example, the chart shown in FIG. 6.

In the case where a correlation between the evaluation and the quality is determined to exist, the processor 30 may further analyze. For example, the processor 30 calculates a change in the degree of abnormality with respect to the time. In the case where the degree of abnormality tends to increase, it is predicted that the number of defects will increase thereafter. For example, the processor 30 outputs the prediction result. Or, the evaluation of the equipment imaged in the first image may be decided based on the first image. In such a case, the evaluation is represented, for example, by the feature of the first image. The processor 30 analyzes the correlation between the multiple features and the multiple qualities. Also in this method, it is possible to monitor the quality effectively.

In the case of using the feature as the evaluation, the processor 30 may mesh-process the first image. In the mesh processing, an image is split into multiple meshes, and features are calculated for respective meshes. The processor 30 uses the feature of one of the multiple meshes in each of the multiple first images as the evaluation.

Or, the processor 30 may analyze the correlation between the evaluation and the quality by the following method.

The processor 30 extracts two first images from the multiple first images, and split the two first images into multiple meshes. The processor 30 calculates each difference of the feature between the corresponding meshes. The processor 30 extracts the first mesh having the largest difference of the feature. The processor 30 respectively sets the features of the first meshes in the multiple first images as the multiple evaluations. The processor 30 analyzes the correlation between the multiple evaluations and the multiple qualities.

In the above processing, the processor 30 further performs, for example, the following processing in the case where no correlation is determined to exist.

The processor 30 extracts a second mesh having the second largest difference of the feature between corresponding meshes. The processor 30 respectively sets the features of the second meshes in the multiple first images as multiple evaluations. The processor 30 analyzes the correlation between the multiple evaluations and the multiple qualities.

According to this analysis method, the correlation between the evaluation and the quality can be analyzed more efficiently. For example, the amount of calculation by the processor 30 can be reduced.

When the mesh processing of the first image is performed, the processor 30 may split the parts where movement of the subject is large into smaller meshes and may split the parts where movement of the subject is small (or nil) into larger meshes. Thereby, the feature can be weighted; and the change of the feature is detected easily. For example, the region inside the image where fine mesh processing is performed and the region inside the image where coarse mesh processing is performed are determined based on the change of the feature between the first image and the image directly before the first image.

For example, the processor 30 splits, into multiple meshes, the second image imaged at the nth (n=1, 2, 3, . . . ) second timing. The second timing is before the first timing. The processor 30 splits, into multiple meshes, the first image imaged at the nth first timing. The processor 30 calculates each difference of the feature between the meshes corresponding between the first image and the second image. A larger difference of the feature indicates that movement of the subject in the mesh is large.

The processor 30 merges the meshes having small differences of the feature and makes larger meshes. The processor 30 splits the meshes having large differences of the feature into pluralities and makes smaller meshes. Thereby, the feature can be weighted to be larger for the parts where movement of the subject is larger.

Figure 7:
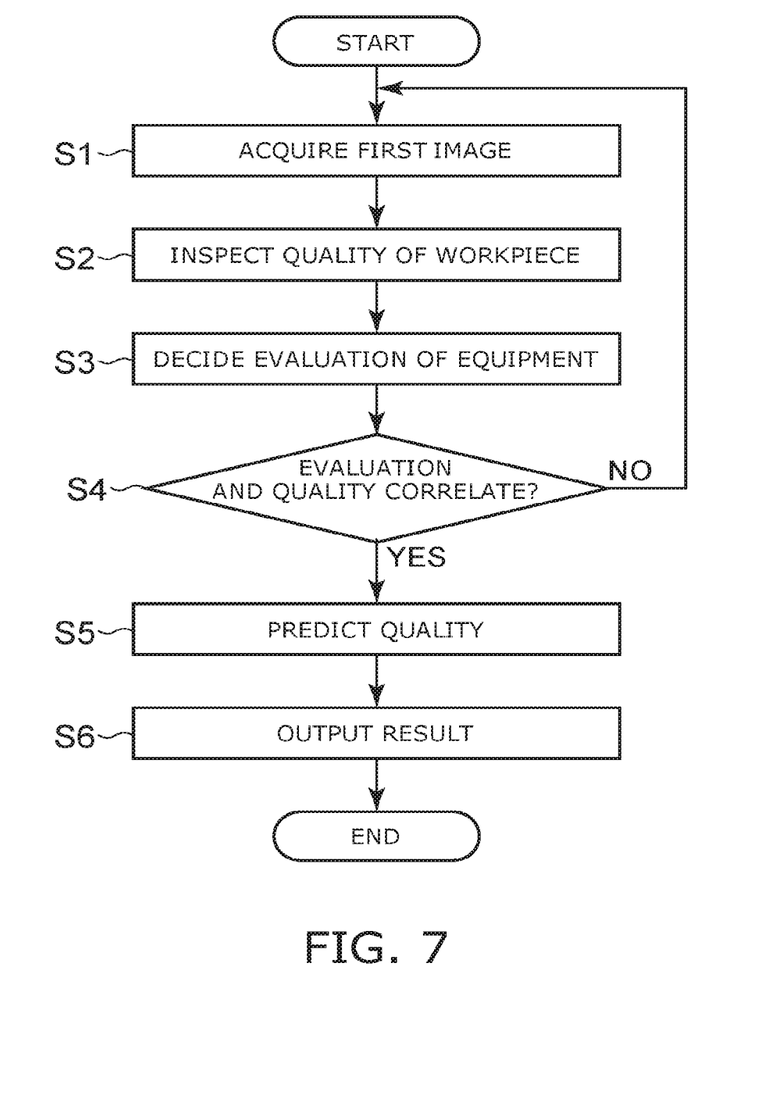
FIG. 7 is a flowchart illustrating the operation of the quality monitoring system according to the embodiment.

FIG. 7 is a flowchart illustrating the operation of the quality monitoring system according to the embodiment.

For the equipment repeating the first operation, the imager 10 repeatedly acquires the first image of the equipment imaged at the first timing of the first operation (step S1). The inspector 20 inspects the quality of the workpiece processed by the equipment (step S2). The processor 30 decides multiple evaluations of the equipment imaged in the first image based on the multiple first images (step S3).

The processor 30 analyzes whether multiple qualities and multiple evaluations are correlated (step S4). In the case of not being correlated, steps S1 to S3 are repeated. In the case of being correlated, the processor 30 may output the result. Or, as illustrated in FIG. 7, the processor 30 may predict a future change in quality from a change in the evaluations (step S5). In the case where it is predicted that the quality will deteriorate, the processor 30 outputs the result (step S6). For example, the processor 30 transmits a signal for stopping the equipment or notifies the user.

The quality monitoring system 1 according to the embodiment described above can analyze the correlation between the operation of the equipment and the quality more easily.

(Modification)

The processor 30 may determine an abnormality of the equipment imaged in the first image based on the multiple first images. The abnormality includes, for example, a delay in the specific operation, a change in the range of motion of a specific part of the equipment, a change in the position or inclination of the workpiece to be processed, or the like with respect to the normal operation of the equipment.

When the imager 10 acquires a new first image, the processor 30 refers to the memory 50 and acquires a previous first image. The processor 30 determines whether there is an abnormality in the equipment included in the new first image based on the multiple previous first images. For example, In the case where the state of the equipment imaged inside the previous first image and the state of the equipment imaged inside the new first image are substantially the same, it is determined that the equipment is normal. In the case where the state of the equipment inside the previous first image and the state of the equipment inside the new first image are significantly different, the equipment is determined that the equipment is abnormal.

The processor 30 performs, for example, unsupervised learning using the multiple first images A1. Principal component analysis, clustering, etc., can be used as a specific technique of the unsupervised learning. The processor 30 stores, in the memory 50, the model for determining the abnormality of the equipment inside the first image A1 generated by the unsupervised learning.

FIG. 5A to FIG. 5C illustrate the first operation in the case where an abnormality exists in the equipment 90. For example, the processor 30 calculates a difference of the feature between the new first image and one of the multiple previous first images. The one of the multiple previous first images is, for example, the first image acquired directly before the new first image. The processor 30 compares the calculated difference with a first threshold. When the difference exceeds the first threshold, the processor 30 determines that an abnormality exists in the equipment which is the subject of the new first image.

The first threshold is set based on feature data. For example, the average value and the standard deviation are calculated based on the previous feature data. 3σ is calculated and set as the first threshold. Using machine learning, the set first threshold and the feature based on the newly acquired first image are compared, and it is determined whether or not it is within the threshold.

For example, the difference of the feature is small between the images illustrated in FIG. 3C. The positions of the arm 90a and the hand 90b are the much different between the image illustrated in FIG. 3C and the image illustrated in FIG. 5C. Therefore, the difference of the feature is large between these image; and the equipment 90 inside the image illustrated in FIG. 5C is determined to be abnormal.

The processor 30 may respectively perform mesh processing of the new first image and the previous first image. The processor 30 determines the equipment to be abnormal in the case where the difference of the feature is not less than the first threshold for any of the meshes. By performing mesh processing of the first image, the location (the mesh) where the abnormality of the equipment occurs in the first image can be designated.

When the mesh processing of the first image is performed, as described above, the processor 30 may split the parts where movement of the subject is large into smaller meshes and may split the parts where movement of the subject is small (or nil) into larger meshes.

When determining the abnormality of the equipment, the processor 30 may utilize a signal generated by the equipment in addition to the first image. For example, it is taken that a change of a voltage value or a current value of the equipment 90 occurs in the equipment 90 when the arm 90a and the hand 90b are driven. In such a case, the processor 30 receives a signal indicating the voltage value or the current value of the equipment 90 from a sensor detecting the voltage value or the current value. The processor 30 compares the intensity of the received signal to a preset first range. For example, the processor 30 determines the equipment 90 to be abnormal in the case where the difference of the feature between the new first image and the previous first image exceeds the first threshold and the signal strength is outside the first range.

In the case where the abnormality occurs in the equipment, typically, an abnormality occurs also in the signal output from the equipment. The precision of the determination can be increased by determining the abnormality of the equipment based on the imaged image and the signal output from the equipment. Thereby, for example, the likelihood of determining an abnormality even though an abnormality has not occurred in the equipment can be reduced. Other than the voltage value and the current value, for example, the processor 30 may determine the abnormality of the equipment by utilizing a signal indicating a pressure, a gas flow rate, etc., of the equipment.

The processor 30 may calculate a similarity between the new first image and one of the multiple previous first images, and determines the abnormality of the equipment imaged in the first image based on the similarity. The processor 30 compares the calculated similarity and a preset threshold. When the similarity is less than a threshold, the processor 30 determines that an abnormality exists in the equipment which is the subject of the new first image.

Or, the processor 30 may perform mesh processing of each of the multiple first images and may calculate each similarity between the corresponding meshes. When the mesh processing of the first image is performed, the processor 30 may change the size of the mesh according to the magnitude of the movement of the subject. In addition to the similarity, the processor 30 may use a signal generated by the equipment to determine the abnormality.

The output content of the outputter 40 can be modified as appropriate according to the processing of the processor 30. The outputter 40 may show specifically the location where the abnormality occurs in the first image. For example, in the case where the mesh processing of the first image is performed by the processor 30, the location (the mesh) where the abnormality occurs in the first image can be designated. The outputter 40 shows the location designated by the processor 30. Thereby, the user can easily ascertain which part of the equipment is determined to be abnormal by the quality monitoring system 1.

The processor 30 may analyze the correlation between the quality and the evaluation in the case where the equipment imaged in the new first image is determined to be abnormal. By analyzing the correlation in the case of being determined to be abnormal, it is possible to analyze the influence of the abnormality on the quality. The amount of calculation by the processor 30 can also be reduced.

Figure 8:
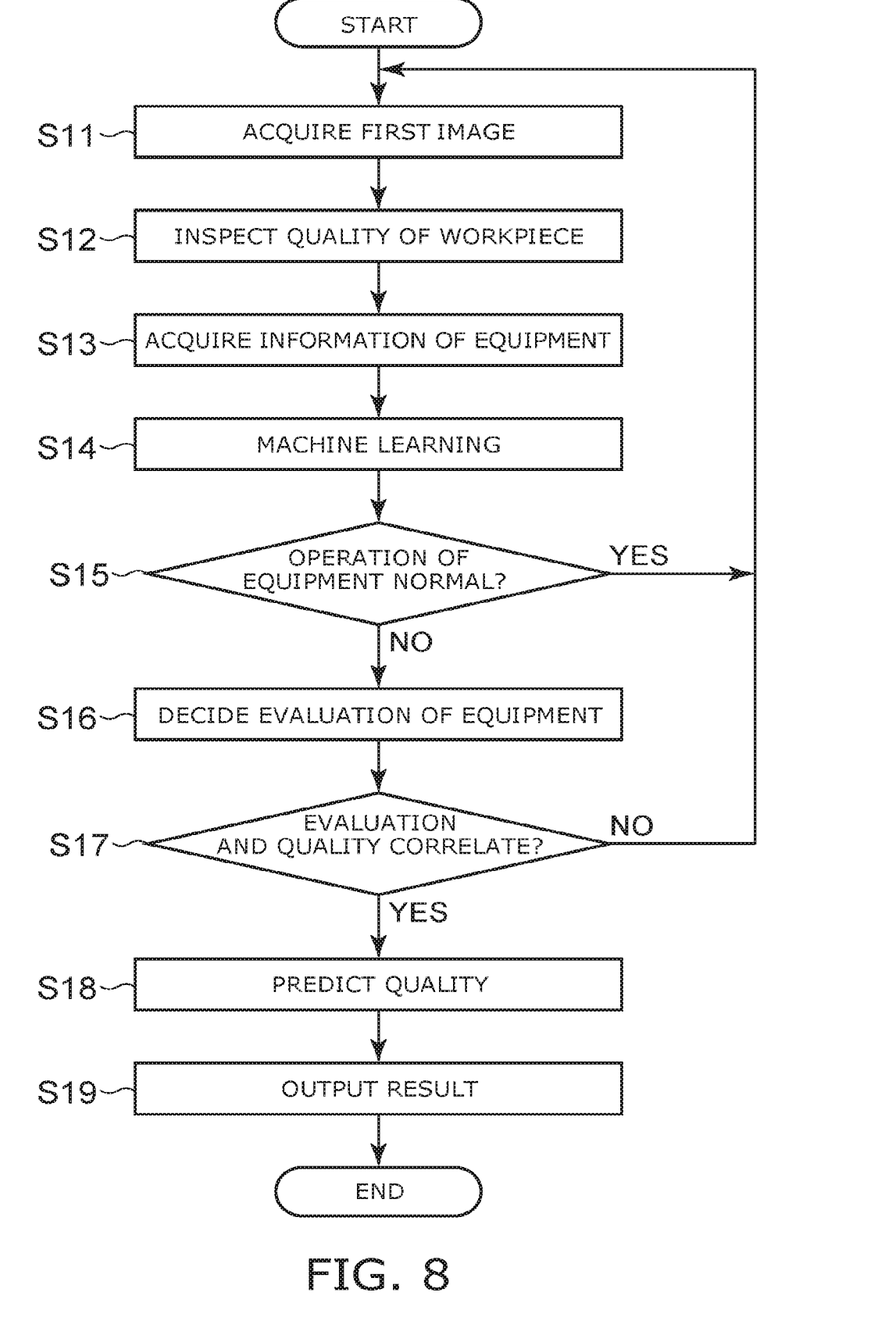
FIG. 8 is a flowchart illustrating the operation of the quality monitoring system according to a modification of the embodiment.

FIG. 8 is a flowchart illustrating the operation of the quality monitoring system according to a modification of the embodiment.

For the equipment repeating the first operation, the imager 10 repeatedly acquires the first image of the equipment imaged at the first timing of the first operation (step S1). The inspector 20 inspects the quality of the workpiece processed by the equipment (step S12). The processor 30 acquires information on the operation of the equipment (step S13). This information is, for example, a signal output from the equipment. The processor 30 compares the new first image with the multiple previous first images to perform machine learning (step S14). The processor 30 determines whether the operation of the equipment is normal based on the comparison result of the new first image and the multiple previous first images and based on the information on the operation of the equipment (step S15).

When the operation of the equipment is determined to be abnormal, the processor 30 decides multiple evaluations of the equipment imaged in the first image based on the multiple first images (step S16). The processor 30 analyzes whether the multiple qualities and the multiple evaluations are correlated (step S17). In the case of not being correlated, step S11 is performed again. Or in the case of not being correlated, the processor 30 may output that an abnormality has occurred in the equipment and the abnormality of the equipment and the quality are not correlated. In the case of being correlated, for example, the processor 30 predicts the future change in the quality from the change in the evaluations (step S18). In the case where the quality is predicted to deteriorate, the processor 30 outputs the result (step S19).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A quality monitoring system, comprising:
an imager repeatedly acquiring a first image of an equipment, the equipment repeating a first operation processing a workpiece, the first image being of the equipment imaged at a first timing of the first operation;
an inspector inspecting a quality of the workpiece after processing; and
a processor deciding, based on a plurality of the first images, an evaluation of the equipment imaged in each of the first images, the processor analyzing a correlation between a plurality of the evaluations and a plurality of the qualities, wherein
the processor
splits each of two first images of the plurality of the first images into multiple meshes and extracts a first mesh having the largest difference of a feature between the corresponding multiple meshes,
sets a plurality of the features of the first meshes in the first images as the evaluations respectively, and
analyzes the correlation between the evaluations and the qualities.

2. The quality monitoring system according to claim 1, wherein the processor
sets a plurality of features of the first images as the evaluations respectively, and
analyzes the correlation between the evaluations and the qualities.

3. The quality monitoring system according to claim 1, wherein the processor outputs information indicating the evaluations, the qualities, and the correlation, in a case where there is the correlation between the qualities and the evaluations.

4. A quality monitoring system, comprising:
an imager repeatedly acquiring a first image of an equipment, the equipment repeating a first operation processing a workpiece, the first image being of the equipment imaged at a first timing of the first operation;
an inspector inspecting a quality of the workpiece after processing; and
a processor
determining an abnormality of the equipment imaged in a new first image when the new first image is acquired, the determining being based on a plurality of previous first images,
deciding an evaluation of the equipment imaged in each of the previous first images when there is the abnormality of the equipment imaged in the new first image, the deciding being based on the new first image and the previous first images, and analyzing a correlation between a plurality of the evaluations and a plurality of the qualities, wherein
the processor
splits each of two first images of the plurality of previous first images into multiple meshes and extracts a first mesh having the largest difference of a feature between the corresponding multiple meshes,
sets a plurality of the features of the first meshes in the first images as the evaluations respectively, and
analyzes the correlation between the evaluations and the qualities.

* * * * *